(12) United States Patent
Hayashi et al.

(10) Patent No.: US 7,952,703 B2
(45) Date of Patent: May 31, 2011

(54) DEVICE AND METHOD FOR MEASURING MICROPOROUS FILM ON BATTERY ELECTRODE PLATE, COATER EQUIPPED WITH FILM MEASURING DEVICE, AND COATING METHOD USING FILM MEASURING METHOD

(75) Inventors: Tetsuya Hayashi, Osaka (JP); Masato Fujikawa, Osaka (JP); Kazutaka Teramoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/607,686

(22) Filed: Oct. 28, 2009

(65) Prior Publication Data

US 2010/0046794 A1 Feb. 25, 2010

Related U.S. Application Data

(62) Division of application No. 11/507,619, filed on Aug. 22, 2006, now Pat. No. 7,679,739.

(30) Foreign Application Priority Data

Sep. 2, 2005 (JP) ................................. 2005-254333

(51) Int. Cl.
*G01J 1/10* (2006.01)
(52) U.S. Cl. .................................. 356/243.1; 356/243.4
(58) Field of Classification Search ..... 356/243.1–243.8
See application file for complete search history.

(56) References Cited

U.S. PATENT DOCUMENTS

| 5,678,126 | A | * | 10/1997 | Rathbun ........................... 399/30 |
| 5,727,604 | A | | 3/1998 | Koike et al. |
| 5,795,394 | A | | 8/1998 | Belotserkovsky et al. |
| 2001/0016363 | A1 | * | 8/2001 | Yano et al. ........................ 438/9 |
| 2006/0216608 | A1 | | 9/2006 | Ohata et al. |
| 2006/0248710 | A1 | | 11/2006 | Fukumoto et al. |
| 2007/0122715 | A1 | | 5/2007 | Fujino et al. |

FOREIGN PATENT DOCUMENTS

JP 05-104062 4/1993

(Continued)

OTHER PUBLICATIONS

Chinese Office Action, with English Translation, issued in Chinese Patent Application No. CN 2006101267797, mailed on Jul. 3, 2009.

(Continued)

*Primary Examiner* — Michael P Stafira
(74) *Attorney, Agent, or Firm* — McDermott Will & Emery LLP

(57) ABSTRACT

There is provided a film measuring device capable of accurately and easily measuring the thickness of a microporous film formed on a battery electrode plate over the entire area of the film. A color CCD sensor 8 shoots the microporous film. A video board 11 converts a color tone of a color image signal obtained by the image pickup into gradation data of respective color components of RGB. After the data conversion, an image processing board 12 extracts line images of the respective color components. A calculator 14 obtains the thickness of the microporous film by referring to pre-measured film thickness reference values corresponding to the gradation data of the green or blue color component, which are stored in a table storage 13 as reference thickness table data, using the gradation data of the line image of the green color component or the blue color component as lookup data.

8 Claims, 4 Drawing Sheets

FOREIGN PATENT DOCUMENTS

| | | |
|---|---|---|
| JP | 05-115821 | 5/1993 |
| JP | 7-035514 | 2/1995 |
| JP | 8-96806 | 4/1996 |
| JP | 8-309262 | 11/1996 |
| JP | 09-015044 | 1/1997 |
| JP | 09-133517 | 5/1997 |
| JP | 10-239027 | 9/1998 |
| JP | 11-195587 | 7/1999 |
| JP | 11-351830 | 12/1999 |
| JP | 2000-353515 | 12/2000 |
| JP | 2001-124525 | 5/2001 |
| JP | 2002-025541 | 1/2002 |
| JP | 2002-122552 * | 4/2002 |
| JP | 2003-142078 | 5/2003 |
| JP | 2005-134324 | 5/2005 |
| WO | WO 2005/011043 A1 | 2/2005 |
| WO | WO 2005/067080 A1 | 7/2005 |
| WO | WO 2005/081336 A1 | 9/2005 |

OTHER PUBLICATIONS

Japanese Office Action, with English translation, issued in Japanese Patent Application No. 2005-254333, mailed Dec. 15, 2009.

* cited by examiner

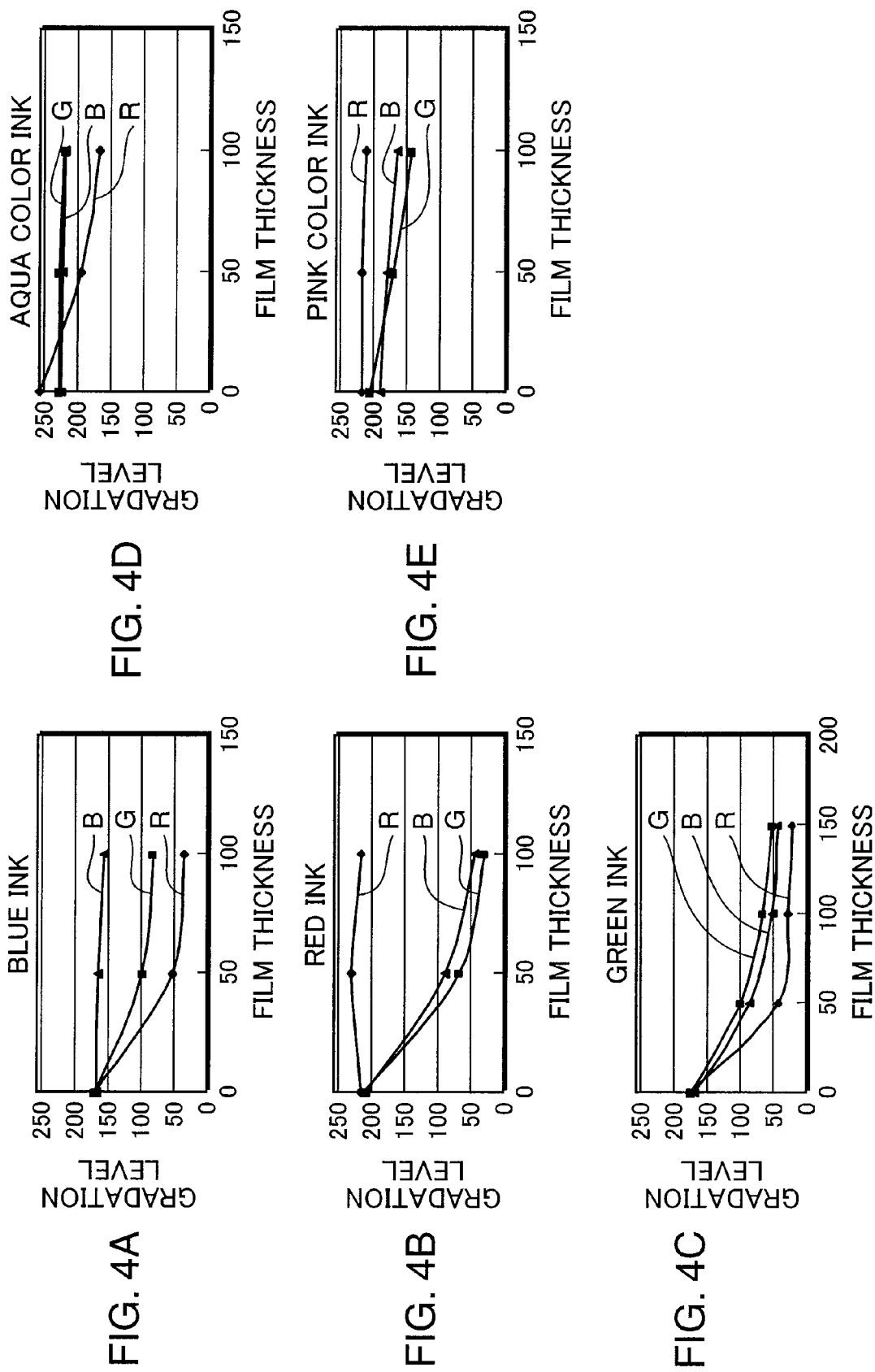
FIG. 4A BLUE INK
FIG. 4B RED INK
FIG. 4C GREEN INK
FIG. 4D AQUA COLOR INK
FIG. 4E PINK COLOR INK

DEVICE AND METHOD FOR MEASURING MICROPOROUS FILM ON BATTERY ELECTRODE PLATE, COATER EQUIPPED WITH FILM MEASURING DEVICE, AND COATING METHOD USING FILM MEASURING METHOD

RELATED APPLICATIONS

This application is a Divisional of U.S. patent application Ser. No. 11/507,619, filed on Aug. 22, 2006, now U.S. Pat. No. 7,679,739, claiming priority of Japanese Patent Application No. 2005-254333, filed on Sep. 2, 2005, the entire contents of each of which are hereby incorporated by reference.

BACKGROUND OF THE INVENTION

1. Field of the Invention

The present invention relates to a device and a method for measuring a thickness and a weight per unit area of a microporous film formed on an electrode plate for a battery, as well as a coater equipped with the film measuring device, and a coating method using the film measuring method.

2. Description of the Related Art

Heretofore, there has been used a technique of measuring the weight per unit area of a microporous film formed on an electrode plate for a battery, as disclosed in Japanese Laid-Open Patent Publication No. H8 (1996)-96806 (D1), for instance. In D1, a β-ray emitter and a detector are arranged as opposed to each other, with an electrode material being fed in a certain direction between the β-ray emitter and the detector. The β-ray emitter and the detector are moved in cooperation with each other in a width direction of a film to be measured, i.e. in a direction orthogonal to the feeding direction of the electrode material. During the movements of the β-ray emitter and the detector, the β-ray emitter emits β-rays, and the detector detects the amount of the β-rays transmitted through the electrode material. The weight per unit area of the microporous film is measured by comparing a detection result on the β-ray transmission with a reference transmission amount.

In the above arrangement, the measurement sites are only the positions where the β-ray emitter and the detector are moved, and accordingly, it is impossible to conduct the measurement for the entire area of the electrode material. Also, it is hazardous to handle β-rays. The installation condition for the β-ray emitter is constrained because a radioactive ray is used. Further, a qualified staff is required to operate the β-ray emitter, which hinders usability of the β-ray emitter. In addition, the β-ray emitter is expensive. Furthermore, since the microporous film is thin, a variation in β-ray transmission amount due to a thickness variation of the microporous film is significantly small. Also, the variation in β-ray transmission amount is smaller than a variation in β-ray transmission amount due to thickness variations of a metal sheet as a base member, and an active material layer, which makes the weight detection difficult. Further, even if a fluorescent X-ray is used in place of the β-ray, a variation in fluorescent X-ray transmission amount is significantly small, and an attenuation of the fluorescent X-ray in the air is significantly large, which also makes the weight detection difficult.

Japanese Laid-Open Patent Publication No. H8 (1996)-309262 (D2) proposes a film thickness measuring device constructed such that: a UV ray is irradiated onto a surface of a golf ball coated with a clear coat made of a clear coating material containing a fluorescent brightening agent; secondary emission rays obtained by the UV ray irradiation are captured by a CCD camera; a contrast image is obtained by multilevel-processing the acquired image data; and the thickness of the coat is measured based on the contrast image.

It is, however, impossible to measure the film thickness, unless the film has a property responsive to a specific wavelength, even by modifying the art recited in D2 so as to measure the thickness of the film formed on the film-like or sheet-like base member.

SUMMARY OF THE INVENTION

In view of the above problems residing in the conventional examples, it is an object of the present invention to provide a film measuring device and method capable of accurately and easily measuring a physical amount of a microporous film formed on an electrode plate of a secondary battery over the entire area of the film, as well as a coater equipped with the film measuring device, and a coating method using the film measuring method.

An aspect of the present invention is directed to a film measuring device for measuring a physical amount of a microporous film formed on at least one of electrode plates of a positive electrode and a negative electrode of a secondary battery. The device includes: an image pickup section for converting a color tone of a color image obtained by capturing an image of the microporous film into gradation data of respective color components; a table storage for storing therein pre-measured reference values of the physical amount of the microporous film corresponding to gradation levels of at least one of the color components in the form of a table; and a calculator for obtaining the physical amount of the microporous film by referring to the reference values of the physical amount stored in the table storage, and by using, as lookup data, the gradation data of the at least one color component among the gradation data of the respective color components obtained by the image pickup section.

Another aspect of the present invention is directed to a coater including: the aforementioned film measuring device; a coating section for coating a coating material for the microporous film after forming an active material layer on a sheet-like base member; and a coating amount controller for controlling the coating amount for the microporous film in the coating section in accordance with the physical amount of the microporous film obtained by the calculator of the film measuring device.

Yet another aspect of the present invention is directed to a film measuring method for measuring a physical amount of a microporous film formed on at least one of electrode plates of a positive electrode and a negative electrode of a secondary battery. The method includes steps of: converting a color tone of a color image obtained by capturing an image of the microporous film into gradation data of respective color components; and obtaining a physical amount of the microporous film by referring to pre-measured reference values of the physical amount of the microporous film corresponding to the gradation data of at least one of the color components obtained in the conversion step, using the gradation data of the at least one color component as lookup data, the reference values being stored as table data.

Still another aspect of the present invention is directed to a coating method using the aforementioned film measuring method. The coating method includes steps of: forming an active material layer on a sheet-like base member; coating a coating material for the microporous film on the active material layer; and controlling the coating amount for the microporous film in the coating step in accordance with the physical amount of the microporous film obtained by the film measuring method.

These and other objects, features and advantages of the present invention will become more apparent upon reading the following detailed description along with the accompanying drawing.

BRIEF DESCRIPTION OF THE DRAWING

FIG. 4A is a graph showing relationships between thickness of blue ink, and gradation levels of respective color components of red (R), green (G), and blue (B) in the case where the blue ink is coated on a matte black finished mixture layer.

FIG. 4B is a graph showing relationships between thickness of red ink, and gradation levels of respective color components of red (R), green (G), and blue (B) in the case where the red ink is coated on a matte black finished mixture layer.

FIG. 4C is a graph showing relationships between thickness of green ink, and gradation levels of respective color components of red (R), green (G), and blue (B) in the case where the green ink is coated on a matte black finished mixture layer.

FIG. 4D is a graph showing relationships between thickness of aqua color ink, and gradation levels of respective color components of red (R), green (G), and blue (B) in the case where the aqua color ink is coated on a matte black finished mixture layer.

FIG. 4E is a graph showing relationships between thickness of pink color ink, and gradation levels of respective color components of red (R), green (G), and blue (B) in the case where the pink color ink is coated on a matte black finished mixture layer.

DETAILED DESCRIPTION OF THE PREFERRED EMBODIMENTS

Figure 1:
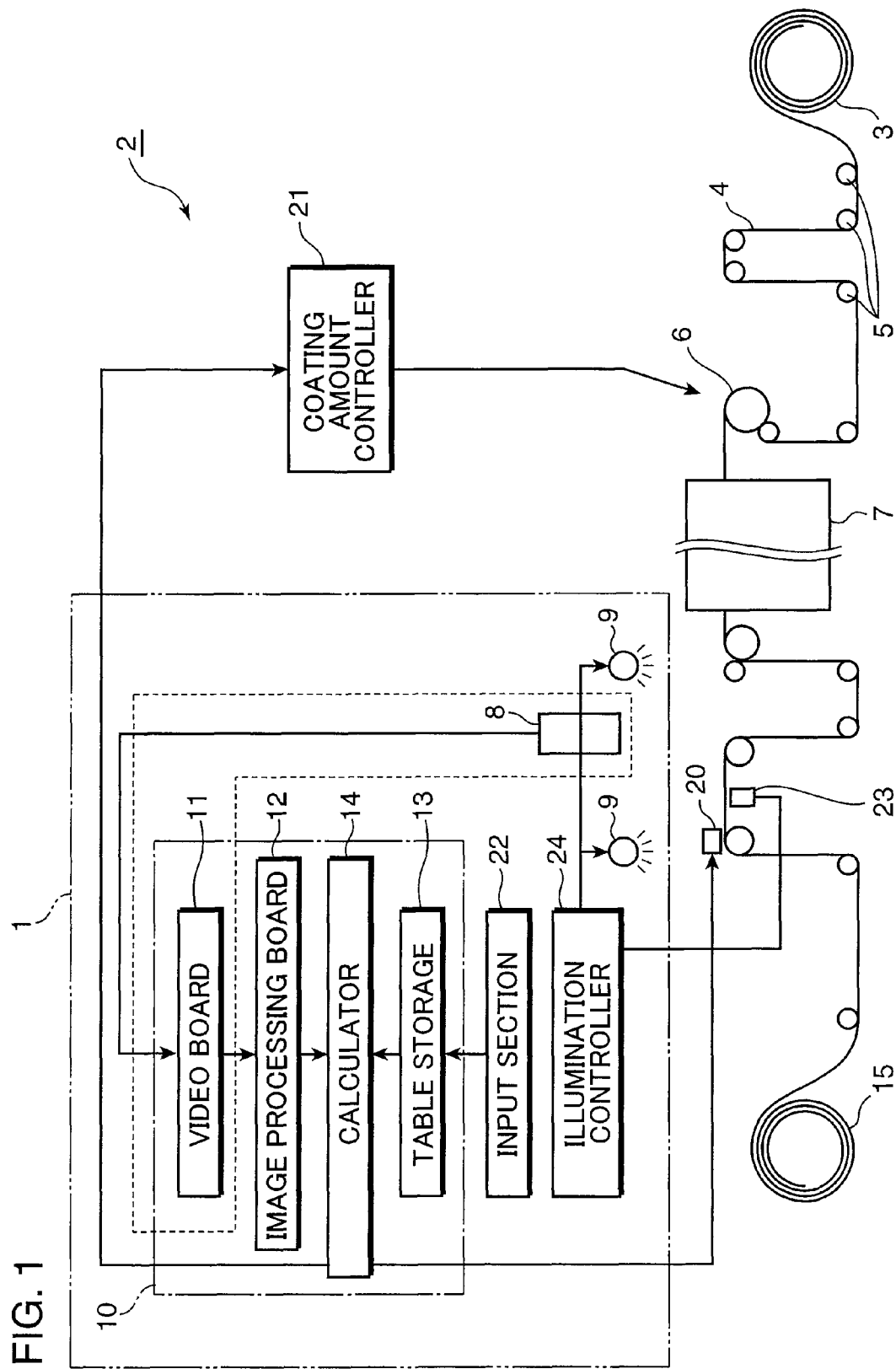
FIG. 1 is a diagram showing an entire configuration of a coater equipped with a film measuring device according to an embodiment of the invention.

FIG. 1 is a diagram showing an entire configuration of a coater 2 using a film measuring device 1 according to a preferred embodiment of the invention. The film measuring device 1 is adapted for measuring, as physical amounts of a microporous film, the thickness and the weight per unit area of the microporous film formed on an electrode plate of a lithium secondary battery. The lithium secondary battery includes a positive electrode containing a composite lithium oxide, a negative electrode containing a lithium retainable material, a separator, and an electrolyte solution containing a non-aqueous solvent, wherein the microporous film containing an inorganic oxide filler and a binder is adhesively formed on at least one of electrode plates of the positive electrode and the negative electrode. In this embodiment, an arrangement and an operation of the coater 2 for forming an alumina film on a negative electrode are illustrated and described as an example of the invention.

The negative electrode 4 as an object under test has a sheet-like shape, and is spirally wound in the form of a roll 3. Hereinafter, the negative electrode 4 is called as "electrode sheet 4". The electrode sheet 4 is sequentially dispensed and fed through a plurality of guide rollers 5, so that an alumina paint is coated on the electrode sheet 4 by a coating section 6. After the coating, the electrode sheet 4 is guided to a drying furnace 7 where the paint coated on the electrode sheet 4 is dried. The film measuring device 1 is disposed at an outlet of the drying furnace 7.

In the film measuring device 1, a color CCD sensor 8 and an illumination light source 9 are disposed on the side corresponding to the surface of the electrode sheet 4 where the alumina paint is coated. Immediately at a downstream of a position where the electrode sheet 4 comes out of the drying furnace 7, the illumination light source 9 illuminates the alumina film on the electrode sheet 4, and the color CCD sensor 8 sequentially captures images of the alumina film on an area over the entire width of the electrode sheet 4. The color CCD sensor 8 may include plural sensing devices arrayed in a line in such a manner that the sensing devices capture images of the alumina film on an area substantially covering the entire width of the electrode sheet 4. The illumination light source 9 is a straight tube-shaped fluorescent lamp so that an area along the entire width of the electrode sheet 4 can be uniformly irradiated. In the case where ambient light of a sufficient light amount with less external stray light is obtained at the image capturing positions of the color CCD sensor 8, the illumination light source 9 may be omitted.

A color image signal outputted from the color CCD sensor 8 is sent to an image controller 10. Then, a video board 11 in the image controller 10 sequentially converts the input signal, i.e., a composite video signal obtained by superimposing a carrier chrominance signal to a luminance signal into primary color signals of red (R), green (G), and blue (B) of e.g. 8 bits, i.e. 256 gradation data. The color CCD sensor 8 and the video board 11 constitute an image pickup section.

An image processing board 12 in the image controller 10 extracts line image images in the width direction of the electrode sheet 4 based on the respective primary color signals of RGB. It is effective to use the green color component or the blue color component in order to measure the thickness of the alumina film. In view of this, a table storage 13 stores therein pre-measured reference values of film thickness corresponding to the respective gradation levels of the green color component or the blue color component in the form of a reference thickness table. The effectiveness of the green color component or the blue color component will be described later.

A calculator 14 reads out a film thickness corresponding to a targeted gradation level by referring to the film thickness reference values stored in the table storage 13, and by using the gradation data concerning the green color component or the blue color component of the respective line images acquired by the image processing board 12, as lookup data. In the case where it is judged that there is no film thickness data corresponding to the targeted gradation level in the table storage 13, the calculator 14 obtains film thickness data corresponding to the targeted gradation level, using various approaches such as approximation or data interpolation for a film thickness characteristic with respect to the targeted gradation level, according to needs. Comparison in the calculator 14 between the measured value and the reference value in gradation level may be carried out in the unit of pixels, or may be made by dividing the captured image into predetermined number of areas, and by calculating an average in each of the areas.

The calculator 14 judges whether the thickness of the alumina film lies within an allowable range relative to a predetermined reference value. If the calculator 14 judges that the film thickness lies out of the allowable range, the calculator 14 judges that the negative electrode plate carrying the alumina film as a defective electrode plate. Then, the calculator 14 issues a marking signal to a marker 20 so that a defective area on the alumina film is identified. In this case, even if the film thickness lies out of the allowable range in the order of several square centimeters ($cm^2$) on an area of the negative electrode plate, in an actual process, an area on the negative electrode in the order of several square meters ($m^2$) is required to be removed as a defective area. In view of this, the calculator 14 detects a predetermined area on the alumina film including the area where the film thickness is judged to lies out of the allowable range, as a defective area.

After the test on the thickness of the alumina film is conducted, the electrode sheet 4 is wound into a roll 15.

The table storage 13 stores therein data relating to the weight per unit area of alumina, which is a material for the film, in relation to the respective gradation levels of the green color component or the blue color component in the form of a reference weight table, as well as the data relating to the measured values of the film thickness corresponding to the respective gradation levels of the green color component or the blue color component. By the storage of the tables, the calculator 14 is allowed to calculate the thickness and the weight per unit area of the alumina film.

Also, the calculator 14 outputs a correction signal to a coating amount controller 21 so that the calculated film thickness coincides with a predetermined reference value. The coating amount controller 21 controls the coater 6 to make a coating amount constant by changing a coating condition in response to the correction signal. Specifically, in case of using a die coater, a rotation speed of a pump is changed to control the coating amount. In case of using a gravure coater, a coating speed ratio is changed to control the coating amount. Thus, feedback control is performed to attain a constant thickness for the alumina film.

An input section 22 is connected to the table storage 13. After the film thickness of the electrode sheet 4 is measured, and the electrode sheet 4 is withdrawn from the film forming process, an operator is allowed, using the input section 22, to input data obtained by actually measuring the thickness and the weight per unit area of the alumina film for storage into the table storage 13. In this way, by allowing the operator to input the table data by way of the input section 22, a calibration curve concerning a relationship between gradation levels of the respective color components and the coating amount can be corrected, or the number of sampling data can be increased. Thus, measurement precision on the thickness and the weight per unit area of the film can be enhanced.

An illuminance sensor 23 is disposed on the side of the electrode sheet 4 opposite to the side where the color CCD sensor 8 and the illumination light source 9 are disposed. The illuminance sensor 23 measures the illuminance of the illumination light source 9 when transport of the electrode sheet 4 is suspended, for instance, at the time of exchanging the roll 3, 15. Alternatively, the illuminance sensor 23 may be disposed outside of an end of the electrode sheet 4 so that the illuminance of the illumination light source 9 is constantly measured. In such a case, feedback control is performed so that an illumination controller 24 controllably keeps the illuminance of the illumination light source 9 constant based on a measurement result by the illuminance sensor 23. With this arrangement, the illuminance of illumination light can be maintained constant, despite aging degradation of the illumination light source 9 or fluctuation of a power source voltage, thereby enabling accurate film thickness measurement.

The above configuration realizes the coater 2 capable of accurately and easily measuring the thickness and the weight per unit area of a film coated on the electrode sheet, and easily controlling the film forming process. Also, selecting at least one color component which is effective in film thickness measurement enables to measure the thickness and the weight per unit area of a microporous film made of an intended material. Further, the thickness and the weight per unit area of the film over the entire area thereof can be measured by changing the image pickup position, or by providing the image pickup position for the entire area of the object under test.

The color component to be stored in the table storage 13 may be a color component that has a large contrast relative to the base member, and has a relatively large change in gradation level in estimated variation ranges for the thickness and the weight per unit area of the film. A monochromatic color component may be used. Alternatively, combination of plural color components may be used in the case where the plural color components show a remarkable change between plural regions within the aforementioned variation ranges. Further alternatively, the color component may be in the form of a composite signal obtained by combining a color-difference signal to a luminance signal, in place of the signals respectively representing the individual color components of RGB, or cyan (C), magenta (M), and yellow (Y).

Figure 2:
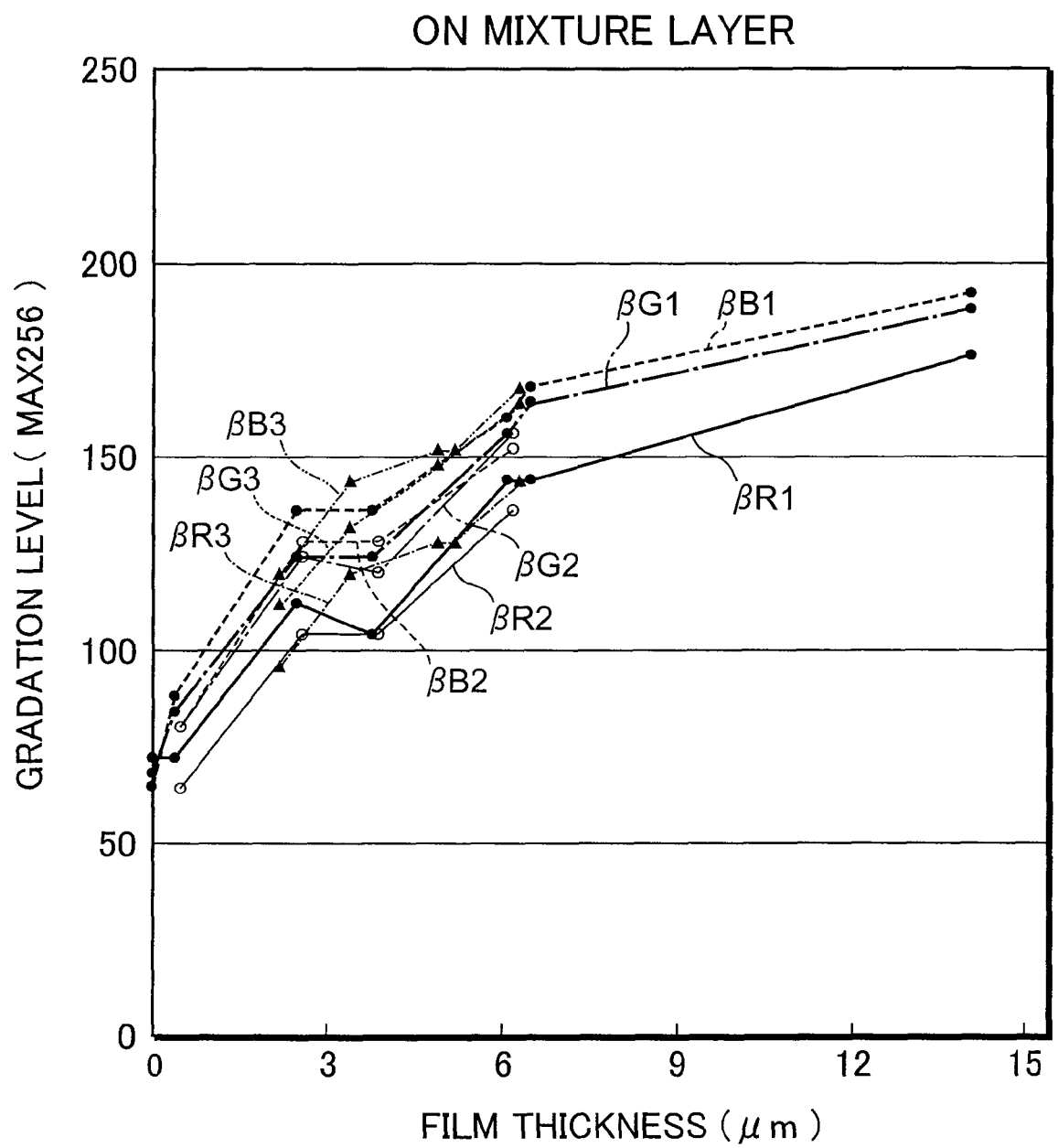
FIG. 2 is a graph showing relationships between thickness of an alumina layer, and gradation levels of respective color components of red (R), green (G), and blue (B) in the case where the alumina layer is formed on a mixture layer formed by coating a carbon material on a copper foil.

FIG. 2 is a graph showing relationships between thickness of an alumina layer, and gradation levels of the respective color components of RGB, in the case where the alumina layer is formed on a mixture layer containing a carbon material on a copper foil.

Specifically, the alumina layer is formed by firstly coating a mixture layer, as an active material layer, containing a carbon material on the copper foil as a base member, and then coating an alumina paint containing an alumina as an inorganic oxide filler, and a binder on the active material layer. In this case, the white powdery alumina paint is coated onto the matte black finished mixture layer.

Referring to FIG. 2, first sampling data are denoted by reference numerals βR1, βG1, and βB1; and second sampling data are denoted by reference numerals βR2, βG2, and βB2. Third sampling data denoted by reference numerals βR3, βG3, and βB3 are measurement data in which the viscosity of the alumina paint is changed by changing the composition ratio of the binder relative to the alumina. Specifically, an active material with a density of 1.63 g/$cm^3$ is coated on a copper foil of 16 μm in thickness so that the thickness of the active material layer on one surface of the copper film is 100 μm. Then, an alumina paint in NMP (N-methyl-2-pyrrolidone) solution, with a solid content ratio of 45% and a composition ratio of alumina to PVDF (polyvinylidene fluoride) at 96:4, is coated on the active material layer.

Figure 3:
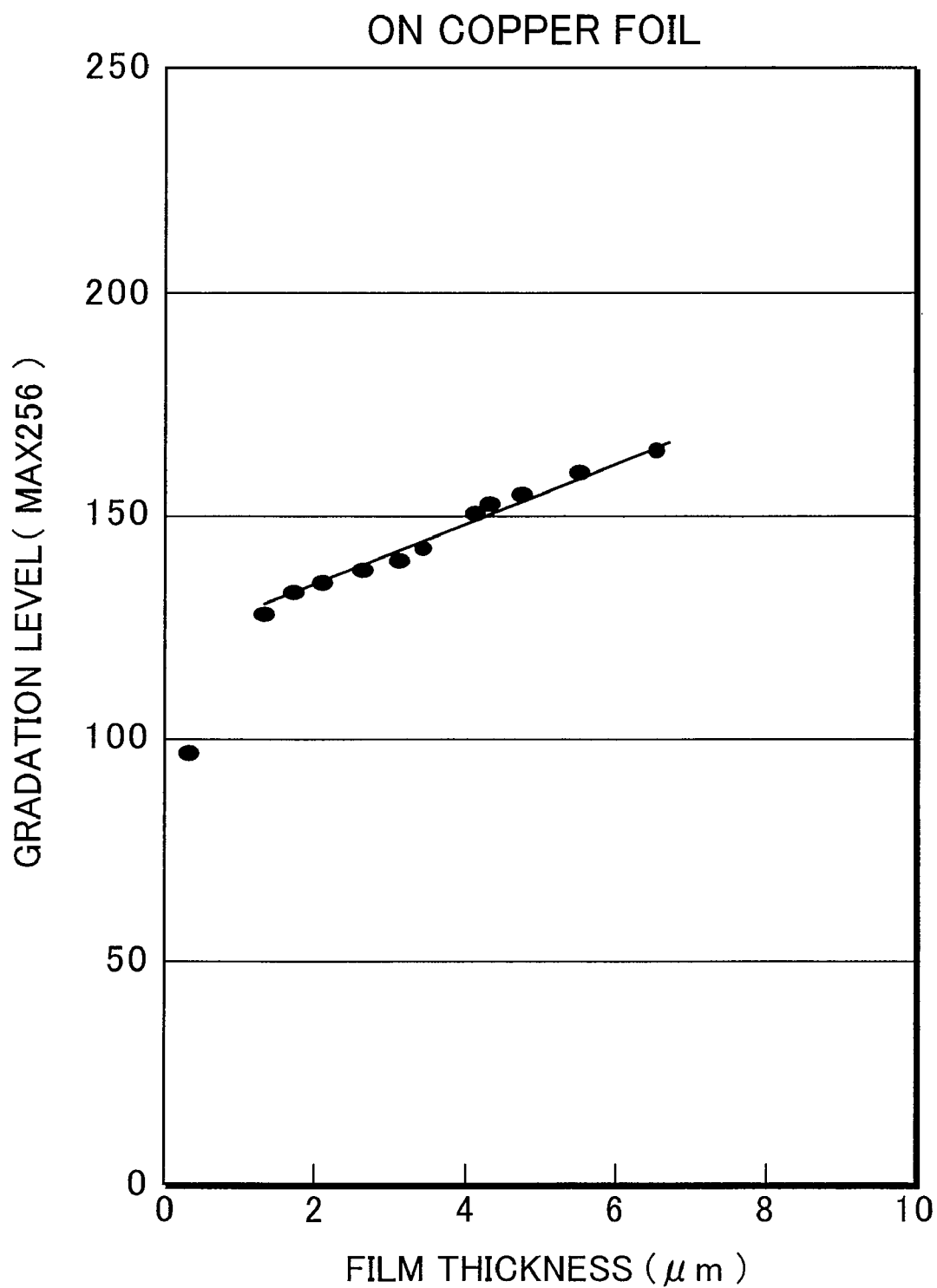
FIG. 3 is a graph showing relationships between thickness of an alumina layer, and gradation level of the color component (B) in the case where the alumina layer is formed on a mixture layer formed by coating a carbon material on a copper foil.

As is obvious from FIG. 2, changes in gradation level among the respective color components of RGB are substantially the same. This shows that use of any color component among the three color components is acceptable. Also, measurement precision can be enhanced by combining the color components. FIG. 3 and Table 1 show film thickness with respect to gradation level of the blue color component.

TABLE 1

| | on base member |
|---|---|
| thickness (μm) | gradation of blue color component |
| 0.3 | 97 |
| 1.3 | 128 |
| 1.7 | 133 |
| 2.5 | 134 |
| 3.0 | 135 |
| 3.7 | 138 |
| 4.0 | 140 |
| 4.2 | 143 |
| 4.5 | 151 |
| 4.8 | 153 |
| 5.0 | 155 |
| 5.5 | 160 |
| 6.5 | 165 |

As shown in FIG. 3, it is possible to recognize a thickness variation in the order of 1 μm, as a gradation level change in the gradation range from 0 to 256. Titanium oxide and magnesia show substantially the same gradation level changes as the alumina used as the inorganic oxide filler in the embodiment.

The film measuring device 1 in the embodiment not only measures the thickness and the weight per unit area of the alumina layer, but also is capable of measuring a semitransparent film which is formed on an electrode plate for a battery, and whose color tone is varied depending on the film thickness.

FIGS. 4A, 4B, 4C, 4D, and 4E are graphs each showing relationships between ink thickness, and gradation levels of the respective color components of RGB in the case where ink of a certain color is coated on a matte black finished mixture layer. FIG. 4A shows a case that blue ink is coated, FIG. 4B shows a case that red ink is coated, FIG. 4C shows a case that green ink is coated, FIG. 4D shows a case that aqua color ink is coated, and FIG. 4E shows a case that pink color ink is coated.

The following is an analysis result on FIGS. 4A through 4E. Since a thickness variation relative to the gradation level of the red color component is great in the case where the blue ink, the green ink, and the aqua color ink are coated, it is comprehended that use of the red color component is effective for the blue ink, the green ink, and the aqua color ink. Since a thickness variation relative to the gradation level of the green color component is great in the case where the red ink and the pink color ink are coated, it is comprehended that use of the green color component is effective for the red ink and the pink color ink. The above clarifies that the thickness of a microporous film formed on an electrode plate for a battery can be measured, using at least color component of the captured color image.

The foregoing embodiment describes the film measuring device for measuring the thickness and the weight per area of the microporous film formed on the negative electrode plate of the lithium secondary battery. Alternatively, the invention is applicable to a film measuring device for measuring the thickness and the weight per area of a microporous film formed on at least one of electrode plates of a positive electrode and a negative electrode in an alkaline secondary battery such as a nickel-cadmium secondary battery, or a nickel-hydride secondary battery.

The following is a summary on the features of the invention.

A film measuring device according to a first aspect of the present invention is a device for measuring the thickness of a microporous film in a lithium secondary battery including a positive electrode containing a composite lithium oxide, a negative electrode containing a lithium retainable material, a separator, and an electrolyte solution containing a non-aqueous solvent, wherein the microporous film contains an inorganic oxide filler and a binder, and is adhesively formed on at least one of electrode plates of the positive electrode and the negative electrode of the lithium secondary battery. The device includes: an image pickup section for converting a color tone of a color image obtained by capturing an image of the microporous film into gradation data of respective color components; a reference thickness table storage for storing therein pre-measured reference values of the film thickness corresponding to gradation levels of at least one of the color components in the form of a table; and a calculator for obtaining a thickness of the microporous film by referring to the film thickness reference values stored in the reference thickness table storage, and by using the gradation data of the at least one color component, as lookup data, among the gradation data of the respective color components obtained by the image pickup section.

A film measuring device according to a second aspect of the present invention is a device for measuring the weight per unit of a microporous film in a lithium secondary battery including a positive electrode containing a composite lithium oxide, a negative electrode containing a lithium retainable material, a separator, and an electrolyte solution containing a non-aqueous solvent, wherein the microporous film contains an inorganic oxide filler and a binder, and is adhesively formed on at least one of electrode plates of the positive electrode and the negative electrode of the lithium secondary battery. The device includes: an image pickup section for converting a color tone of a color image obtained by capturing an image of the microporous film into gradation data of respective color components; a reference weight table storage for storing therein pre-measured reference values of the weight per unit area corresponding to gradation levels of at least one of the color components in the form of a table; and a calculator for obtaining a weight per unit area of the microporous film by referring to the weight per unit area reference values stored in the reference weight table storage, and by using the gradation data of the at least one color component, as lookup data, among the gradation data of the respective color components obtained by the image pickup section.

With the above arrangements, in the case where at least one of the positive and negative electrodes in the lithium secondary battery has a battery electrode plate on which the microporous film containing the inorganic oxide filler and the binder is adhesively formed, in the process of forming the microporous film on the battery electrode plate, specifically, in measuring the thickness and the weight per unit area of the film in non-contact state using the image pickup section, the image pickup section shoots the microporous film to obtain the color image, converts the color tone of the acquired color image into gradation data of the respective color components, and outputs the gradation data. Also, the reference thickness table storage and the reference weight table storage store therein the pre-measured thickness reference values and the pre-measured weight per unit area reference values as plural sampling data, and the gradation data concerning one or more color components which is effective in measuring the thickness and the weight per unit area of the film corresponding to each other, in the form of tables, respectively.

The color component effective in measuring the thickness and the weight per unit area of the film is a color component that has a large contrast relative to the base member, and has a relatively large change in gradation level in estimated variation ranges for the thickness and the weight per unit area of the film. A monochromatic color component may be used. Alternatively, combination of plural color components may be used in the case where the plural color components show a remarkable change between plural regions within the aforementioned variation ranges. Further alternatively, the color component may be in the form of a composite signal obtained by combining a color-difference signal to a luminance signal, in place of % the signals respectively representing the individual color components of RGB, or cyan (C), magenta (M), and yellow (Y).

Also, the calculator for calculating the thickness and the weight per unit area of the film reads out the thickness and the weight per unit area of the film corresponding to a targeted gradation level by referring to the reference thickness table and the reference weight table, and by using the gradation data of the at least one color component which is effective in measuring the thickness and the weight per unit area of the film among the gradation data of the respective color components obtained by the image pickup section. If, however, the data concerning the film thickness and the data concerning the weight per unit area corresponding to the targeted gradation level are not stored in the table storage, the calculator obtains data concerning the thickness and the weight per unit area of the film corresponding to the targeted gradation level, using the techniques such as approximation or data interpolation for the thickness and the weight per unit area of the film corresponding to the targeted gradation level, according to needs.

In the above arrangement, the thickness and the weight per unit area of the film can be accurately and easily measured. Also, selecting at least one color component which is effective in measuring the thickness and the weight per unit area of the film enables to measure the thickness and the weight per unit area of a microporous film made of an intended material. Further, changing the image pickup position, or providing the image pickup position over the entire area of the object under test enables to measure the thickness and the weight per unit area of the film over the entire area thereof.

In the film measuring device of the first aspect, preferably, the microporous film is formed on the electrode plate of the negative electrode, the inorganic oxide filler is alumina, magnesia, or titanium oxide, the lithium retainable material is a carbon material, the image pickup section converts the color image into the gradation data of a red color component, a green color component, and a blue color component, the reference thickness table storage stores therein the film thickness reference values corresponding to the gradation levels of the green color component and the blue color component, and the calculator uses the gradation data of at least one of the green color component and the blue color component as the lookup data.

With the above arrangement, in the case where the inorganic oxide filler as the material of the microporous film formed on the negative electrode is the alumina, magnesia, or titanium oxide, a white powdery coat is coated on a mixture layer. In the case where the lithium retainable material is the carbon material, a matte black finished mixture layer is formed. When the image pickup section captures the image of the white powdery coat coated on the matte black finished mixture layer in terms of the color components of RGB, changes in gradation level concerning the green color component and the blue color component is great relative to changes in the film thickness.

In view of the above, by way of the reference thickness table storage and the calculator, obtaining the thickness of the microporous film, using the at least one of the green color component and the blue color component leads to optimal measurements of the thickness of the microporous film formed on the negative electrode of the lithium secondary battery.

Preferably, each of the film measuring devices further includes an illumination light source for projecting illumination light onto the microporous film; an illuminance sensor for detecting an illuminance of the illumination light; and an illumination controller for feedback controlling the illumination light source so that the illuminance of the illumination light is made constant in accordance with the illuminance detected by the illuminance sensor.

With the above arrangement, the illuminance sensor detects the illuminance of the illumination light, which may be changed due to aging degradation of the illumination light source, or fluctuation of a power source voltage, and the illumination controller feedback controls the illumination light source so that the illuminance of the illumination light is made constant in accordance with the detected illuminance.

The above arrangement enables to maintain the illuminance of the illumination light constant, despite the aging degradation of the illumination light source or the fluctuation of the power source voltage, thereby allowing accurate measurements of the thickness and the weight per unit area of the film.

Preferably, the film measuring device of the first aspect further includes an input section for allowing an operator to input actually measured film thicknesses as the reference values corresponding to the gradation levels of the respective color components for storage into the reference thickness table storage.

With the above arrangement, allowing the operator to withdraw the battery electrode plate after the image pickup, and to input the actually measured film thickness data into the reference thickness table storage storing the pre-measured film thicknesses as the reference values enables to correct a calibration curve concerning a relationship between gradation levels of the respective color components, and coating amount, and to increase the number of the sampling data to thereby enhance measurement precision of the film thickness.

A coater according to another aspect of the present invention includes: the film measuring device having the image capturing section, the reference thickness table storage, and the calculator; a coating section for coating a coating material containing the inorganic oxide filler and the binder after forming an active material layer on a sheet-like base member; a coating amount controller for controlling a coating amount of the coating material in the coating section in accordance with the thickness of the microporous film obtained by the calculator.

With the above arrangement, the coating amount can be automatically controlled in accordance with the film thickness measured by the film measuring device.

Preferably, in the coater, the calculator judges whether the obtained thickness of the microporous film lies within an allowable range relative to a predetermined reference value, and detects a predetermined area on the microporous film including an area where the thickness of the microporous film is judged to lie out of the allowable range, as a defective area.

With the above arrangement, it is easy to detect the predetermined area on the microporous film including the area where the thickness of the microporous film is judged to lie out of the allowable range, as the defective area, which is appropriate for the actual process, as compared with a case that merely the area where the thickness of the microporous film is judged to transgress the allowable range is detected as the defective area.

As described above, the invention is advantageous in accurately and easily measuring the thickness and the weight per unit area of a microporous film made of an intended material over the entire area of the film, automatically controlling the coating amount of the coating material for the film in accordance with the measured thickness and the measured weight per unit area of the film, and easily detecting the defective area of the film in a process of forming the film on an electrode plate of a secondary battery.

This application is based on Japanese Patent Application No. 2005-254333 filed on Sep. 2, 2005, the contents of which are hereby incorporated by reference.

What is claimed is:

1. A film measuring method for measuring a physical amount of a microporous film to be formed on at least one of electrode plates of a positive electrode and a negative electrode of a secondary battery, the method comprising steps of:
   converting a color tone of a color image obtained by shooting the microporous film into gradation data of respective color components; and
   obtaining a physical amount of the microporous film by referring to pre-measured reference values of the physical amount of the microporous film corresponding to the gradation data of at least one of the color components obtained in the conversion step, using the gradation data of the at least one color component as lookup data, the reference values being stored as table data, wherein
   in the conversion step, the color image is converted into the gradation data of at least one color component selected in accordance with a material of the microporous film, and
   the table data represents the reference values of the physical amount of the microporous film stored corresponding to gradation levels of the at least one color component.

2. The film measuring method according to claim 1, wherein
   the secondary battery includes a positive electrode containing a composite lithium oxide, a negative electrode containing a lithium retainable material, a separator, and an electrolyte solution containing a non-aqueous solvent, and
   the microporous film is adhesively formed on the electrode plate, and contains an inorganic oxide filler and a binder.

3. A film measuring method for measuring a physical amount of a microporous film to be formed on at least one of electrode plates of a positive electrode and a negative electrode of a secondary battery, the method comprising of:
   converting a color tone of a color image obtained by shooting the microporous film into gradation data of respective color components; and
   obtaining a physical amount of the microporous film by referring to pre-measured reference values of the physical amount of the microporous film corresponding to the gradation data of at least one of the color components obtained in the conversion step, using the gradation data of the at least one color component as lookup data, the reference values being stored as table data, wherein
   the secondary battery includes a positive electrode containing a composite lithium oxide, a negative electrode containing a lithium retainable material, a separator, and an electrolyte solution containing a non-aqueous solvent,
   the microporous film is adhesively formed on the electrode plate of the negative electrode, and contains an inorganic oxide filler and a binder,
   the inorganic oxide filler is alumina, magnesia, or titanium oxide,
   the lithium retainable material is a carbon material,
   in the conversion step, the color image is converted into the gradation data of a red color component, a green color component, and a blue color component,
   the table data represents the reference values of the physical amount of the microporous film stored corresponding to gradation levels of the green color component and the blue color component, and
   the lookup data is the gradation data of at least one of the green color component and the blue color component.

4. The film measuring method according to claim 1, wherein the physical amount of the microporous film is a thickness of the film, and
   the table data is reference thickness table data representing the pre-measured reference values of the film thickness stored corresponding to gradation levels of the respective color components.

5. The film measuring method according to claim 1, wherein
   the physical amount of the microporous film is a weight per unit area of the film, and
   the table data is reference weight table data representing the pre-measured reference values of the weight per unit area of the film stored corresponding to gradation levels of the respective color components.

6. A coating method using the film measuring method of claim 1, comprising steps of:
   forming an active material layer on a sheet-like base member;
   coating a coating material for the microporous film on the active material layer; and
   controlling the coating amount for the microporous film in the coating step in accordance with the physical amount of the microporous film obtained by the film measuring method.

7. The coating method according to claim 6, further comprising steps of:
   judging whether the physical amount of the microporous film obtained by the film measuring method lies within an allowable range relative to a predetermined reference value; and
   detecting a predetermined area on the microporous film including an area where the physical amount of the microporous film is judged to lie out of the allowable range, as a defective area.

8. The film measuring method according to claim 1, wherein in the conversion step, the color image is converted into the gradation data of at least one of a red color component, a green color component and a blue color component selected in accordance with the material of the microporous film,
   the table data represents the reference values of the physical amount of the microporous film stored corresponding to gradation levels of the at least one of the red color component, the green color component and the blue color component.

* * * * *